United States Patent [19]
Muramoto

[11] 3,797,337
[45] Mar. 19, 1974

[54] DEVICE FOR GUIDING A BAR OF A CUTTER OF A PEELING MACHINE

[75] Inventor: Seishi Muramoto, Komatsu, Japan

[73] Assignee: Kabushiki Kaisha Komatsu Seisakusho

[22] Filed: Jan. 19, 1973

[21] Appl. No.: 325,058

[30] Foreign Application Priority Data
Jan. 26, 1972 Japan ............................ 47/10483

[52] U.S. Cl. ........................................................ 82/20
[51] Int. Cl. ............................................... B23b 5/00
[58] Field of Search ........................................ 82/20

[56] References Cited
UNITED STATES PATENTS

| | | | |
|---|---|---|---|
| 3,426,627 | 2/1969 | Lorenz | 82/20 |
| 3,381,558 | 5/1968 | Eisenhardt | 82/20 |
| 3,165,768 | 1/1965 | Herbkersman | 82/20 X |
| 3,038,361 | 1/1962 | Holzer | 82/20 X |
| 2,338,687 | 1/1944 | Johnson et al. | 82/20 |

Primary Examiner—Harrison L. Hinson
Attorney, Agent, or Firm—Armstrong & Wegner

[57] ABSTRACT

A device for guiding a bar of a cutter of a peeling machine which has a cutter, plural guide rollers provided behind the cutter, plural links for supporting the guide rollers, plural rods connected through rods to the links, and plural connectors connected at the ends to the first rods; which device has a cylinder composed of the case of the cutter and a sleeve, a piston slidably inserted into the cylinder, an air supply port for supplying compressed air from source of compressed air into the cylinder for acting the piston, said connectors being integrally and rotatably connected axially to the piston, a stopper rotatably connected to the end of the piston, a nut fixed to the end of the connector, a rotary stopper of the nut, an adjusting nut screwed to the case of the cutter for adjusting the stopping position of the stopper. Thus, the work to be cut by the device may be always maintained at correct position at the center of the cutters.

2 Claims, 3 Drawing Figures

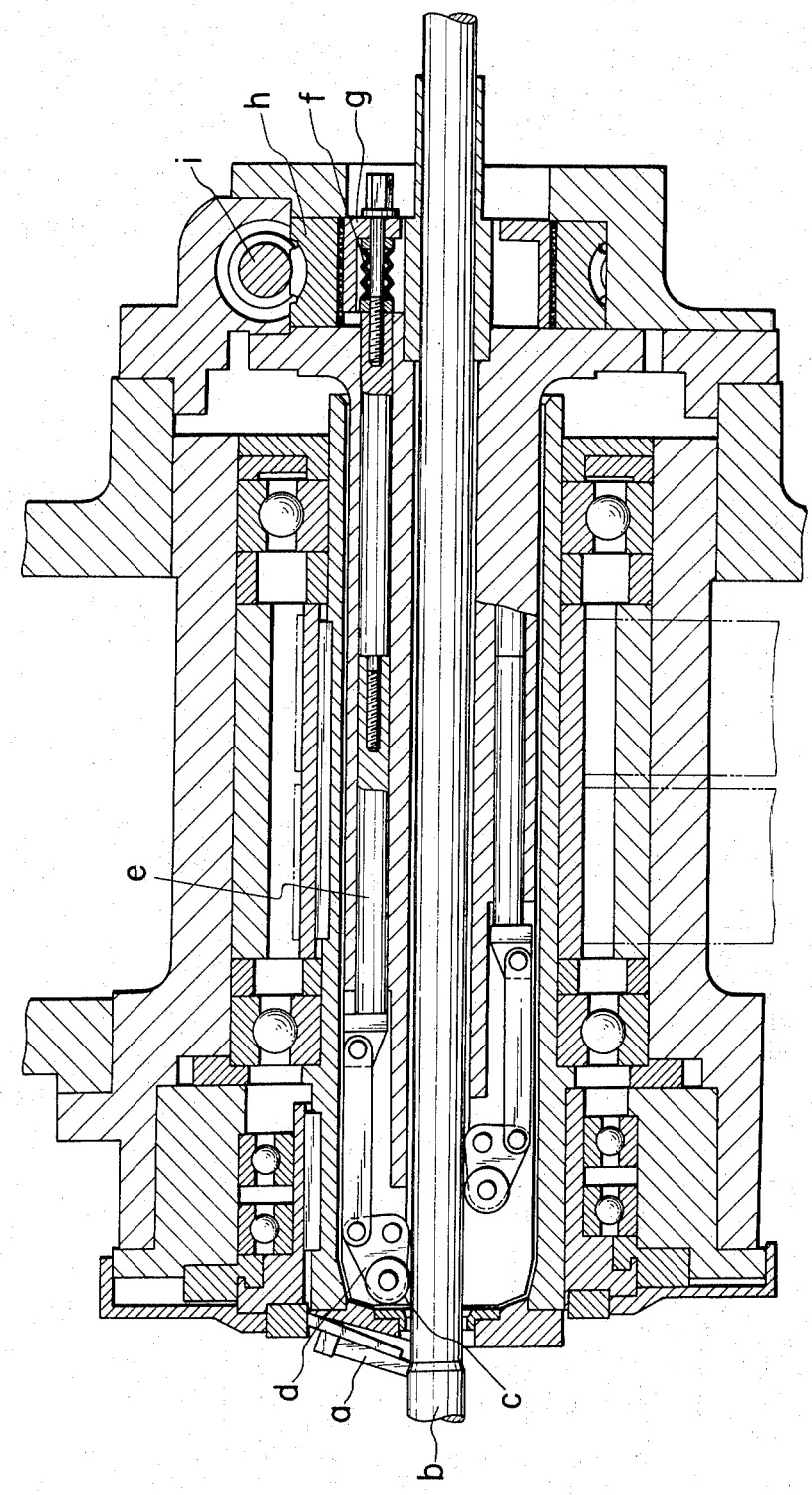

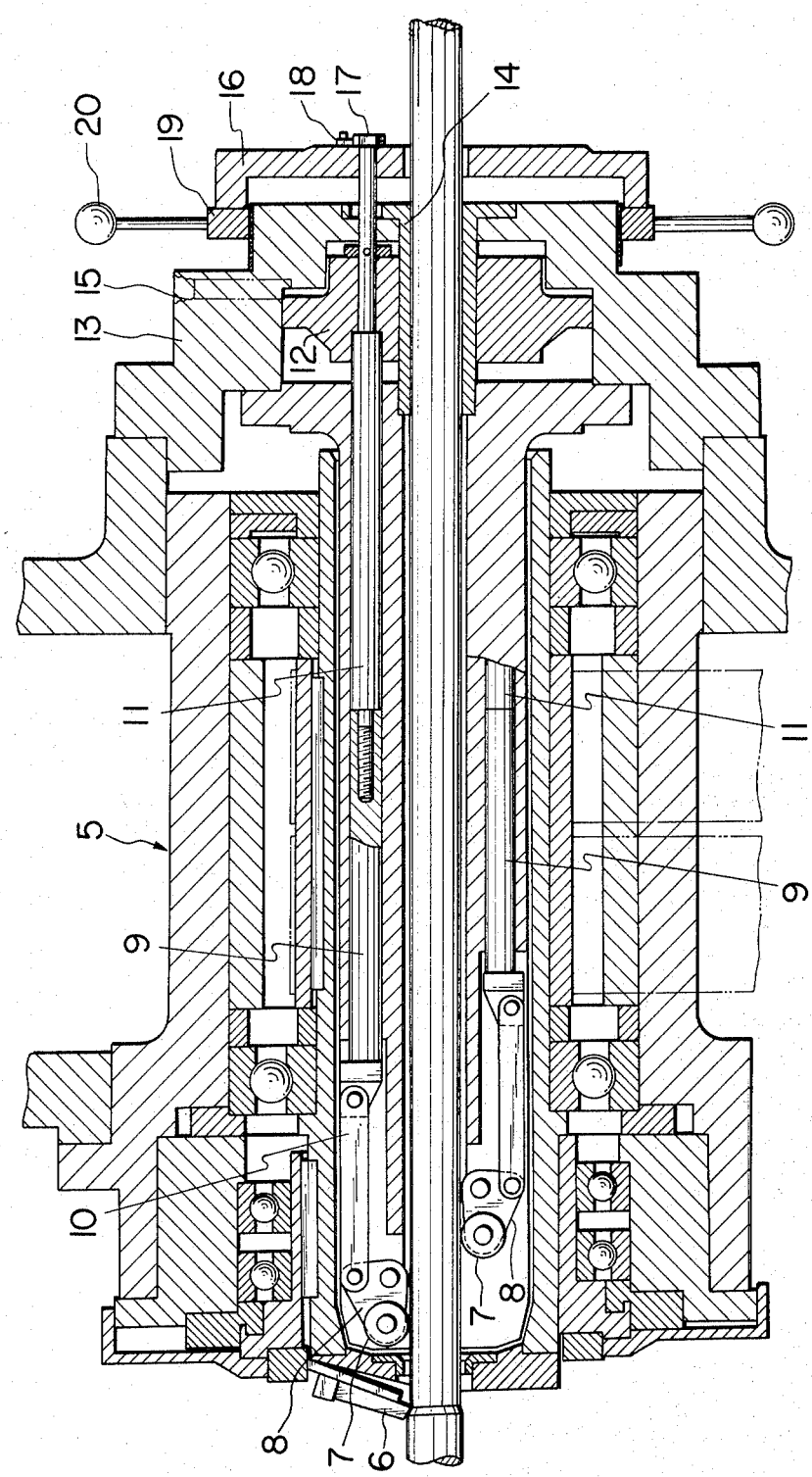

DEVICE FOR GUIDING A BAR OF A CUTTER OF A PEELING MACHINE

This invention relates to a peeling machine, and more particularly to a device for guiding a bar of a cutter of a peeling machine for continuously cutting the outer periphery of bar blank.

The peeling machine forcibly feeds bar blanks continuously fed onto a loader with a blank feeding device so as to cut rotatably the outer peripheral surface of the blank by rotating cutters meanwhile.

In the device for guiding a bar of cutter device of a peeling machine, plural rollers for supporting the bar blank or work from the radial outside of the blank behind the cutters are supported by the links so as to guide the work in centering by acting the rods connected to the links in axial direction. The above rods are connected through the spring members to the ring which are screwed with the worm wheel so that the ring is axially moved by rotatably driving the worm engaged with the worm wheel so as to act the rods.

Since the rods disposed around the work is connected to the ring through the spring member in the above conventional device, if one of the rollers are escaped, the other rollers may move therewith so that the center of the urging force of the plural rollers is displaced from the center with the result that the work cannot be maintained at the center of the cutter device as its disadvantage. In addition, their adjustment must be conducted by the worm and the worm wheel to introduce complicated structure thereby.

The present invention contemplates to eliminate the above disadvantages of the conventional device and to provide novel and improved device for guiding a bar blank of a cutter of a peeling machine.

It is one object of the present invention to provide a device for guiding a bar blank of a cutter device of a peeling machine which may maintain the work at the corrected position always.

It is another object of the present invention to provide a device for guiding a bar blank of a cutter device of a peeling machine which may be simply constructed and may easily be operated.

According to one aspect of the present invention, there is provided a device for guiding a bar blank of a cutter device of a peeling machine having a cutter, a plurality of guide rollers provided behind the cutter, a plurality of links for supporting the guide rollers, a plurality of rods connected through rods to the links, and a plurality of connectors connected at the ends to the first rods, which device comprises a cylinder composed of the case of the cutter device and a sleeve, a piston slidably inserted into the cylinder, an air supply port for supplying compressed air from a source of compressed air into the cylinder for acting the piston, said connectors being integrally and rotatably connected axially to the piston, a stopper rotatably connected to the end of the piston, a nut fixed to the end of the connector, a rotary stopper of the nut, an adjusting nut screwed to the case of the cutter device for adjusting the stopping position of the stopper.

These and other objects, features and advantages of the present invention will become apparent from the following description taken in conjunction with the accompanying drawings, in which:

FIG. 2 is a sectional view of the device for guiding the bar blank of cutter device of the conventional peeling machine; and FIG. 3 is a sectional view of the device for guiding the bar blank of the cutter device of the peeling machine of the present invention.

Figure 1:
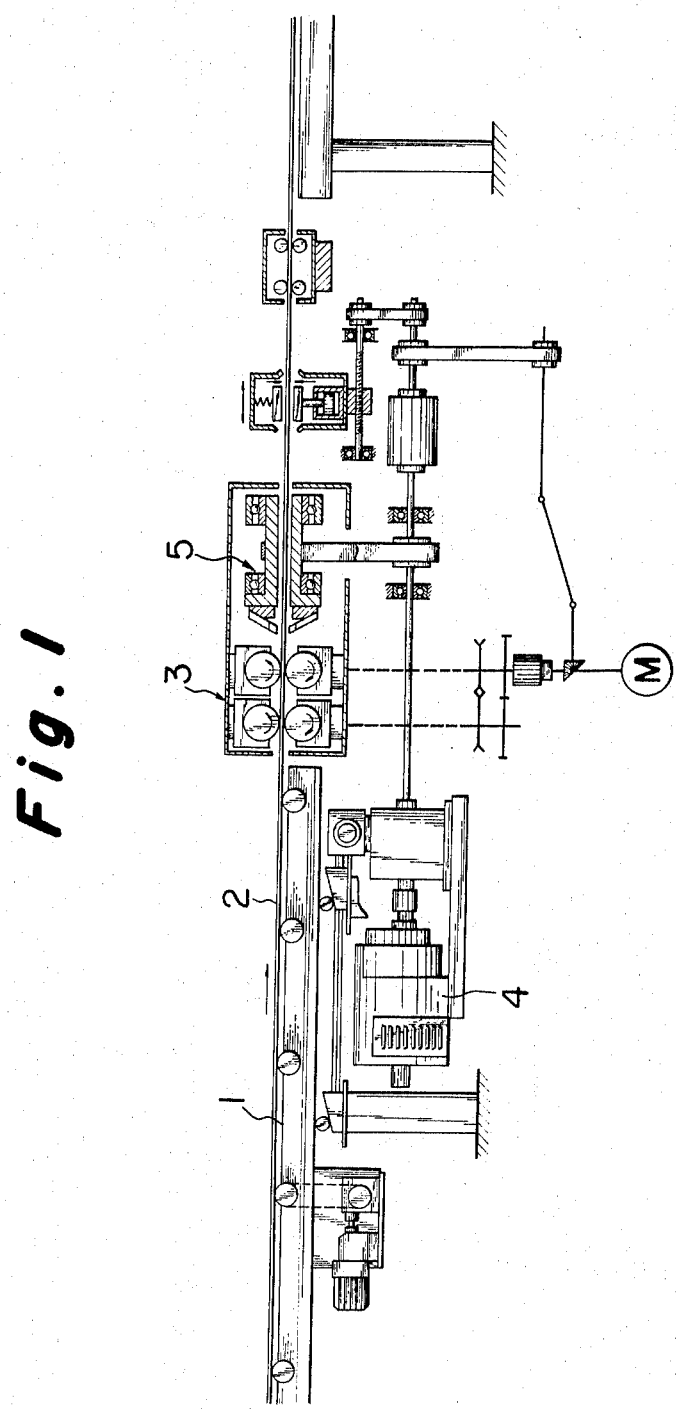
FIG. 1 is a schematic view of the structure of a peeling machine applied with the present invention.

For better understanding of the device for guiding the bar blank of the cutter device of a peeling machine of the present invention, the conventional device will now be described with reference to FIGS. 1 and 2.

As shown in FIG. 1, the peeling machine forcibly feeds bar blanks or works 2 continuously fed onto a loader 1 with a blank feeding device 3 so as to cut rotatably the peripheral surface of the blank by rotating cutter device 5 by a drive motor 4.

In the device for guiding a bar blank or work of cutter device 5 of the above peeling machine as shown in FIG. 2, plural rollers $c$ for supporting the bar blank or work $b$ from the radial outside of the blank or work $c$ behind the cutters $a$ are supported by the links $d$ so as to guide the work $b$ in centering by acting the rods $e$ connected to the links $d$ in axial direction. The above rods $e$ are connected through the spring members $f$ to the ring $g$ which are screwed with the worm wheel $h$ so that the ring $g$ is axially moved by rotatably driving the worm $i$ engaged with the worm wheel $h$ so as to act the rods $e$.

Since the rods $e$ disposed around the work $b$ is connected to the ring $g$ through the spring member $f$ in the above conventional device, if one of the rollers $c$ are escaped, the other rollers $c$ may move therewith so that the center of the urging force of the plural rollers $c$ is disposed from the center with the result that the work $b$ cannot be maintained at the center of the cutter device as its disadvantages.

Reference is now made to the drawings, particularly to FIG. 3, which shows one embodiment of the device for guiding the bar blank of the cutter device of a peeling machine of the present invention.

In the drawing, numeral 6 represents a cutter of a cutter device 5, 7 guide rollers provided behind the cutter 6, 8 links for supporting the guide rollers 7, 9 rods connected through the rods 10 to the links 8, 11 connectors screwed at the ends with the rods 9. 12 represents a piston slidably inserted into the cylinder composed of the case 13 of the cutter device 5 and the sleeve 14 and acted by the force of the compressed air from a source of compressed air (not shown) through the air supply port 15. The connector 11 is integrally and rotatably connected axially to the piston 12, and the end projected from the piston 12 is rotatably connected to the stopper 16. 17 illustrates a nut fixed to the end of the connector 11, 18 is a rotary stopper of the nut 17. 19 represents an adjusting nut for adjusting the stopping position of the stopper 16 in contact therewith to be screwed in the case 13. 20 shows a handle provided on the outer periphery of the adjusting nut 19.

In operation of the device thus constructed, if the nut 17 fixed to the end of the connector 11 is rotated so as to move axially the rod 9, the guide rollers 7 for supporting the work cut by the cutter 6 align its supporting center to the center of the cutters 6 through the link 8. Then, when the compressed air is supplied from source of compressed air (not shown) through the air supply port 15 in such state, the piston 12 is urged leftwardly of the drawing so that the work is held at the center of the cutter 6 by the rollers 7. At that time, the stopper 16 connected to the connector 11 is contacted with the adjusting nut 19 set to a predetermined position by the handle 20 to be stopped.

It should be understood from the foregoing description that since the device of the present invention is thus constructed, even if one of the plural guide rollers 7 disposed around the work is tending to escape therefrom while holding the work, all the force of the piston 12 urged by the compressed air to the link 8 for supporting the rollers 7 tending to escape is gathered to act thereto whereby the work is held to the corrected position always.

It should also be understood that since the holding action is conducted by the piston 12 for acting with the compressed air for the work by the rollers 7, its structure is very simple and its operation is also very easy.

I claim:

1. A device for guiding a bar blank of a cutter of a peeling machine having a cutter, a plurality of guide rollers provided behind said cutter, a plurality of links for supporting said guide rollers, a plurality of first rods connected through second rods to said links, and a plurality of connectors connected at the ends to said first rods, comprising a cylinder composed of the case of said cutter and a sleeve, a piston slidably inserted into said cylinder, an air supply port for supplying compressed air from source of compressed air into said cylinder for acting said piston, said connectors being intergrally and rotatably connected axially to said piston, a stopper rotatably connected to the end of said piston, a nut fixed to the end of said connector, a rotary stopper of said nut, an adjusting nut screwed to the case of said cutter for adjusting the stopping position of said stopper.

2. A device as set forth in claim 1, further comprising a handle provided on the outer periphery of said adjusting nut for handling the adjusting nut.

* * * * *